United States Patent [19]

Besson et al.

[11] Patent Number: 4,633,156
[45] Date of Patent: Dec. 30, 1986

[54] STEPPING MOTOR ASSEMBLY

[75] Inventors: René Besson, Neuchâtel, Switzerland; Yves Guérin, St. Louis, France

[73] Assignee: ETA S.A., Fabriques d'Ebauches, Grenchen, Switzerland

[21] Appl. No.: 725,733

[22] Filed: Apr. 22, 1985

[30] Foreign Application Priority Data

May 4, 1984 [CH] Switzerland .................. 2180/84

[51] Int. Cl.$^4$ .............................................. H02P 8/00
[52] U.S. Cl. .................................... 318/696; 318/685; 368/157
[58] Field of Search ............... 318/696, 685; 368/157, 368/160

[56] References Cited

U.S. PATENT DOCUMENTS

| | | | |
|---|---|---|---|
| 3,887,796 | 6/1975 | Trousdale et al. | 318/696 X |
| 4,234,808 | 11/1980 | Geppert et al. | 318/696 X |
| 4,382,693 | 5/1983 | Xuan | 368/160 |

Primary Examiner—William M. Shoop, Jr.
Assistant Examiner—Saul M. Bergmann
Attorney, Agent, or Firm—Pollock, Vande Sande & Priddy

[57] ABSTRACT

The purpose of the invention is the realization of a motor assembly formed from a stepping motor and its control circuit capable of operating at a maximum speed substantially greater than that obtainable with comparable existing assemblies.

This is effected by substituting for the single coil or for each coil of a known motor two or more windings and adopting a control circuit which connects the windings in series or parallel according to whether motor drive pulses of low or high frequency are applied thereto. The total number of winding turns and the sum of the resistances of the windings are preferably chosen to be equal respectively to the number of turns and the resistance of the coil which they replace in order to avoid basic modification of the characteristics and performances of the motor when operating at low speed.

When the windings are connected in parallel their resistance and equivalent self-inductance are less than that of a single coil. The energy transfer from the voltage source to the rotor of the motor is increased and facilitated and the maximum speed of the motor is considerably increased.

10 Claims, 4 Drawing Figures

STEPPING MOTOR ASSEMBLY

The object of the present invention is to provide a stepping motor assembly which may be utilized to advantage although not limited to, an electronic watch having an analog display.

More precisely, the invention concerns a motor assembly which enables the obtaining of a rotation speed greatly increased relative to that which may be attained by stepping motors presently used in horology.

By motor assembly there must be understood not only the motor itself which is formed by the rotor, the stator and the coils, but likewise the control circuit associated therewith which enables development of motor drive pulses applied to the motor according to the type of function which may be desired.

Moreover, the expression "stepping" signifies that the motor is designed to operate in this manner but does not exclude the possibility of rotation in a continuous manner, that is to say, without stopping of the rotor between two successive drive pulses.

BACKGROUND OF THE INVENTION

In the case of a watch which includes a seconds hand driven by the stepping motor and in which correction is mechanically obtained, it is sufficient to provide a motor which makes a number of steps per second equal to the number which must be made by the seconds hand in order to pass from one division to the following. This number of steps is most often equal to one and sometimes to two or to six. This signifies that the motor need only make a maximum of six steps per second which will not cause difficulties.

On the other hand, a problem arises when in a watch even without seconds hand, time setting corections or changes of the time zone are desired through direct control of the motor. In this case it is necessary to be able to have the motor operate at a frequency greatly increased over 6 Hz, i.e. six steps per second. Presently, with stepping motors of the Lavet type for instance, controlled in the standard manner, it is almost impossible to go beyond 64 Hz or even to guarantee a proper operation of the motor at a frequency greater than 50 Hz. In the case of a watch provided with minutes and hours hands in which the motor steps twice in order that the minutes hand advance through a division, should one wish to bring about a change in the time zone of six hours corresponding to the longest correction necessary if matters are arranged so that the motor may turn in both senses by using for instance the solution found in U.S. Pat. No. 4,112,671, for the control function, it is seen that even with a frequency of 64 Hz it will require more than eleven seconds in order to bring about this correction only. Clearly such is acceptable only with difficulty.

As to electronic time setting in a watch with a seconds hand, such can only be envisaged if one has available two motors for driving the hands, for example one for the seconds hand and one for the minutes and hours hand, or one for the seconds and minutes hands and another for the hours hand. The employment of a single motor would lead to exorbitant correction times.

Swiss patent application No. 5384/82 (corresponding to U.S. Pat. No. 4,550,279), gives an interesting solution which enables driving Lavet type motor in forward and backward operation at a speed greatly increased over 50 or 64 steps per second. This solution comprises the initial application of a starting pulse to the motor in forward or in backward operation to bring about the starting of the motor in the desired sense of rotation, thereafter a succession of simple maintenance pulses of alternating polarity and of duration shorter than that of the starting pulse, and finally simple stopping pulse of opposite polarity to that of the last maintenance pulse and longer than the latter. In the case of forward operation the starting pulse is a simple pulse while for the backward operation such starting pulse is formed from three basic pulses of alternating polarity, the polarity of the first pulse depending from the rest position initially occupied by the rotor. The first basic pulse has as function to urge the rotor in the forward direction in a manner such that it acquires a sufficient energy to be able to make the first step in backward operation under the effect of the two following pulses.

The instants of application of the maintenance and stopping pulses relative to the beginning of the starting pulse may either be determined in advance taking into account the motor characteristics or fixed through the detection of a parameter representative of the movement of the rotor, as for instance the voltage induced by the latter in the motor winding.

This manner of controlling a classic-type Lavet motor enables the employment for the forward operation as well as for the backward operation of a frequency very close to the theoretical synchronous frequency which is on the order of 200 Hz and leads thus to reasonable correction times for a watch indicating only minutes and hours, but still much too long for a watch having a seconds hand. Moreover, it requires a control circuit which is relatively complex.

This invention has as its principal purpose the furnishing of another solution to enable the operation of a stepping motor at a speed substantially greater than that attained up to the present time, at least in the horological domain.

A further purpose of the invention is to provide a solution which, employed in combination with known control methods for stepping motors, enables the attaining of speeds much greater than 200 steps per second.

Additionally, this solution must be adaptable for use with different types of motors, in particular those which are actually employed in the manufacture of watches.

SUMMARY OF THE INVENTION

These purposes are achieved through a motor assembly in conformity with the invention which includes a known type of stepping motor provided with a rotor, a stator, and coil means borne by the stator and having a control circuit for applying motor drive pulses of low frequency to the coil means for obtaining operation of the motor at low speed and the pulses of high frequency for operating the motor at high speed and wherein the improvement provides a coil means which includes n windings (n being greater than or equal to 2) and the control circuit thereof is arranged and adapted to connect the n windings in series when low frequency motor drive pulses are to be applied thereto and in parallel when high frequency motor drive pulses are to be applied thereto.

It is clear that in practice the number n of windings must be limited. It will most often be chosen equal to two, eventually to three.

On the other hand, it may be advantageous notably from the point of view of manufacture, to employ identically fashioned windings, i.e. obtained from the same wire and comprising the same number of turns, although such is not indispensable.

The simplest and most economic manner of putting the invention into practice comprises starting with a stepping motor already designed and manufactured and substituting for the single coil or for each coil presently employed two or more distinct windings and adding thereto a control circuit adapted to the circumstances. In this case one is naturally interested in maintaining the total number of turns in and the sum of electrical resistances of the substituted windings equal or approximately equal to the number of turns in and the resistance of the coil or coils which they replace, since without further modifications than those to the coils, the motor may continue to be controlled by the same slow speed drive pulses and to have practically the same performance, in particular a low consumption and an optimum efficiency when it operates at low speed.

It is to be noted that from the electrical viewpoint several windings connected in series are equivalent to a single winding on condition of course that the nature and the diameter of the wire as well as the coil diameter and the total number of turns are the same in both cases. It is the same from the magnetic viewpoint. For instance, in the case of two identical windings, each having a self-inductance L and assuming that the coupling coefficient between the windings is equal to one, the resulting self-inductance is equal to 4L, i.e. to the self-inductance of the single coil corresponding thereto.

On the other hand, when the windings are connected in parallel, the coils present at the same time a resistance and a self-inductance clearly less than that of the simple coil corresponding thereto. For instance in the particular case envisaged previously with two identical windings, this resistance and inductance are respectively equal to R/2 if R designates the resistance of one winding and to L. The resistance of the coil being reduced, the rotor receives more energy when a motor drive pulse is applied and from the fact that the self-inductance is also less, the winding offers less opposition to the transfer of energy from the control circuit toward the rotor. Thanks to this arrangement it is possible to reduce for instance by half the duration of the motor drive pulses compared to the arrangement wherein there is provided only a single winding and to increase substantially the maximum frequency at which the motor may be controlled.

Naturally, the energy consumption of the motor is increased but this does not constitute a major disadvantage in the case of an electronic watch where the motor is infrequently operated at high speed. Such high speed is necessary only at the moment of time setting and eventually when the hands are displaced in order to indicate something other than the normal time of day, for instance an alarm time or the local time in another time zone.

DESCRIPTION OF THE PREFERRED EMBODIMENT

Figure 1:
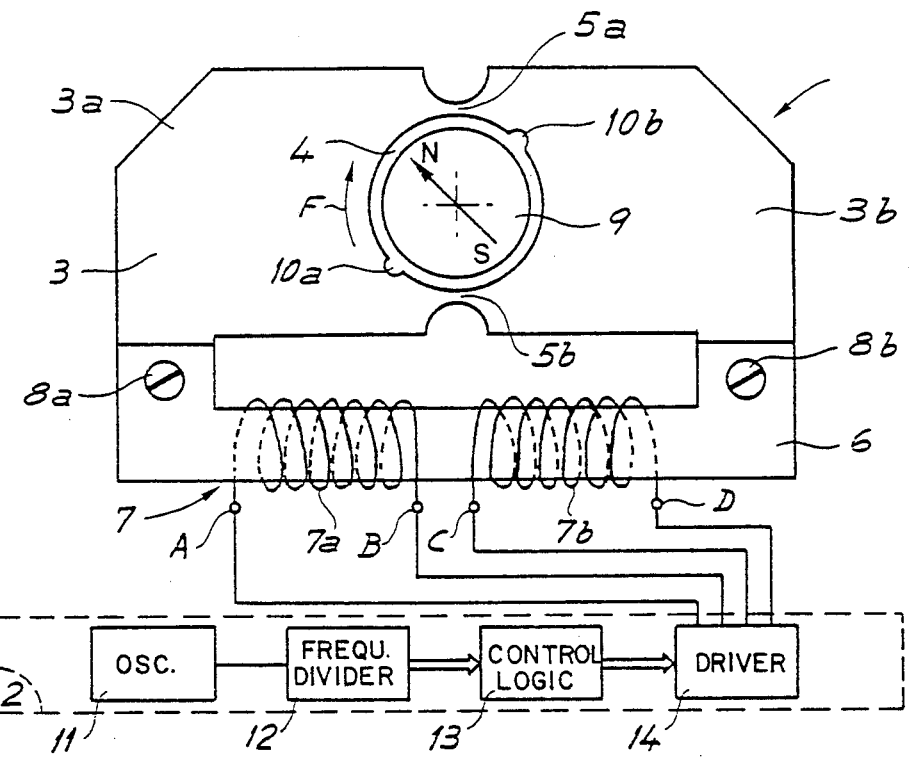
FIG. 1 is a schematic view of a form of execution of the motor assembly according to the invention.

As shown schematically on FIG. 1, the motor assembly according to the invention is particularly intended to equip a watch and comprises a mono-phase bipolar stepping motor of the Lavet type with a stator in a single piece and a control circuit 2 adapted to this type of motor.

Motor 1 comprises a stator 3 with two polar zones $3_a$, $3_b$ between which is arranged a central opening 4 of basically cylindrical form and which are connected to one another on either side of the opening by reduced sections or necks $5_a$, $5_b$ provided to constitute saturable zones for magnetic flux.

The outer ends of polar zones $3_a$, $3_b$ are magnetically coupled by an element 6 which comprises the core of the coil 7. The assembly of the polar portions $3_a$, $3_b$ and the core 6 is obtained by means of screws $8_a$ and $8_b$.

A rotor 9 comprising a diametrally magnetized permanent cylindrical magnet is lodged in the central opening 4 in a manner to be able to turn about an axis which coincides with that of the opening.

Furthermore, the internal wall of the stator which limits the central opening 4 provides two notches $10_a$, $10_b$ which are diametrically opposed and determine two rest positions for the rotor 9 in which its axis of magnetization N-S is essentially perpendicular to the direction joining the notches $10_a$, $10_b$, this direction moreover making an angle of about 45° with a line joining the necks $5_a$ and $5_b$.

To return to the coil 7 the latter corresponds to the particular case previously mentioned, i.e. it is formed by two identical windings $7_a$ and $7_b$ each having a number of turns N and a resistance k, these values N and R being preferably equal, or approximately so, to half of those which would be chosen for the single winding which normally equips a Lavet motor such as has just been described.

The two windings $7_a$ and $7_b$ are shown side by side on the drawing and wound in an inverse sense, but this is not essential. The two windings could also equally well be placed one around the other. One could likewise imagine a core in U form with a winding on each vertical branch of the U. The essential point is that when the coil is energized by the control circuit 2, the two windings $7_a$ and $7_b$ create in the stator magnetic fluxes which add to one another.

The control circuit 2 comprises an oscillator 11 including a quartz resonator and its maintenance circuit and a frequency divider 12 as well as control logic 13 which develops logic signals from the signals of different frequencies provided by the divider and the signal provided by the control means of the watch (not shown). Such logic signals are applied to the drive circuit 14 of the motor formed of power transistors and serve at the same time to assure the connection in series or in parallel of the windings $7_a$ and $7_b$ and the application to the latter of bipolar motor drive pulses.

The oscillator 11 and the frequency divider are of well-known types. As to the control logic circuit 13, it will not be described in detail since its schematic depends from numerous factors, in particular the manner in which the energization circuit is obtained, the frequencies chosen for the motor control, the duration or durations chosen for the motor drive pulses and the control means manual or otherwise with which the watch is provided.

Moreover, this schematic will be different according to whether one chooses to drive the motor in one sense only, that of the forward operation shown by arrow F on FIG. 1, or in both senses in employing for instance the solution provided in the U.S. Pat. No. 4 112 671, previously mentioned, which consists in energizing the motor as usual by simple pulses of alternating polarity for the forward operation and providing for the backward operation and for each step a group of three successive elementary pulses of alternating polarity, the first serving to start the rotor in the sense of forward operation in order that it acquire sufficient energy to be able to rotate thereafter in the reverse sense under the effect of the other two pulses.

Moreover, it is almost always of interest when the motor rotates at low speed to short-circuit the winding at least during a certain time period after the application of each motor drive pulse in order to damp the oscillation of the rotor at the end of a step. This is not necessarily true at high speed. In such case it may be to the contrary advantageous to leave the winding open circuited between pulses in order to avoid that induced current circulates in the windings and that the rotor thereby be braked. Finally, one may also foresee putting the windings in open circuit during a portion of the time of high speed operation of the motor and to short-circuit them thereafter in order for example better to control the stopping of the motor at the end of a number of predetermined steps.

The control logic may thus take numerous forms all of which are clearly obvious to the man skilled in the art. To this extent moreover it is well-known in the case of electronic watches equipped with stepping motors of the Lavet type to control such motors with motor drive pulses of frequency and duration which differ according to whether the watch is in normal operation or in correction mode (see for instance U.S. Pat. No. 4 150 536).

As far as the invention is concerned, the essential point is that the logic 13 be at least capable of normally producing signals permitting the drive circuit 14 to connect the windings $7_a$ and $7_b$ in series and to apply thereto motor drive pulses of alternating polarity and low frequency which will cause the motor to turn forwardly at the rate for example of one or two steps per minute and as controlled by the user of the watch, other signals thanks to which the drive circuits may provide the two windings connected in parallel with motor drive pulses also of alternating polatiry, but of much higher frequency in order that the motor continue to turn in the same sense but practically at the maximum speed which it is capable of attaining.

Naturally, since this maximum speed may be increased by a diminishing duration of the motor drive pulses, there is most often every interest when such is possible in providing control logic which enables supplying the motor with shorter pulses at high speed rather than at low speed.

Moreover, it is evident that it is preferable to be able to have the motor function in both senses in order to reduce the correction time.

Figure 2:
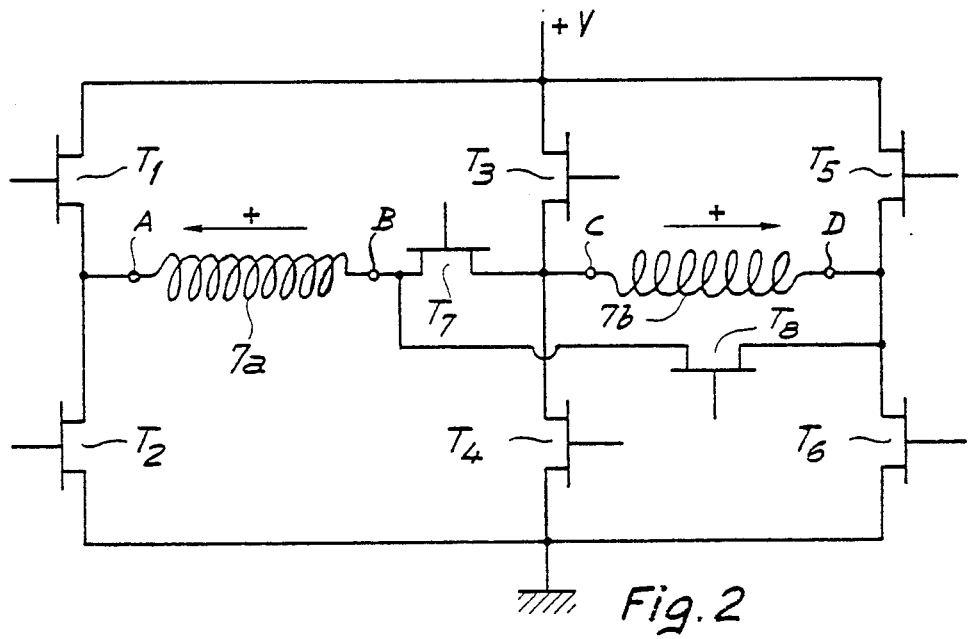
FIGS. 2 and 3 are detailed schematics showing two possible forms of the motor drive circuit which forms part of the control circuit shown by FIG. 1.
Figure 3:
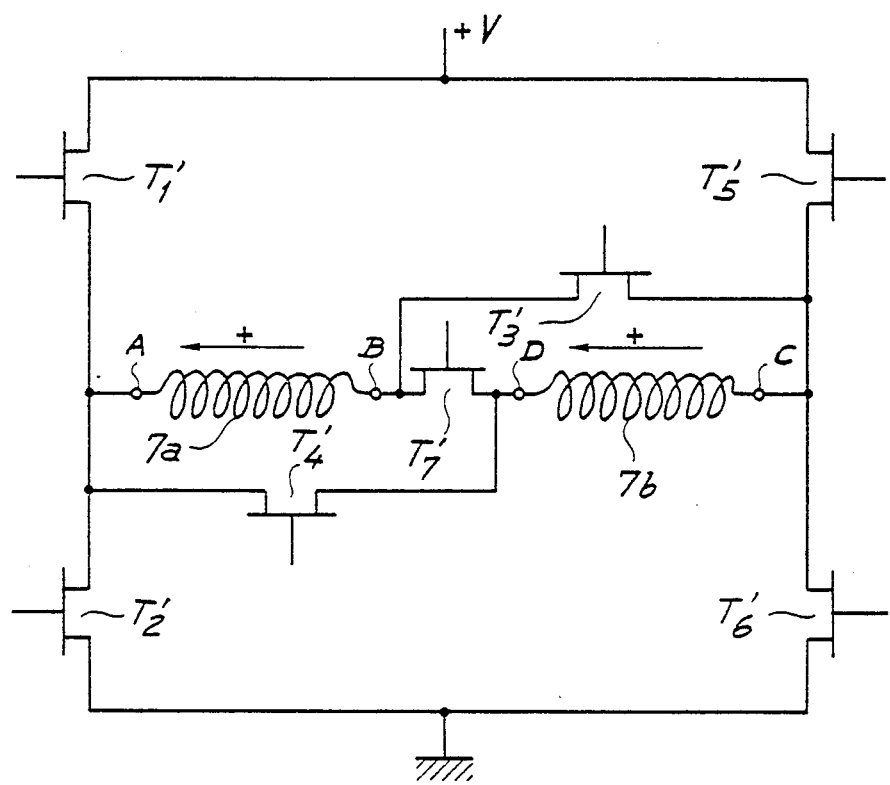

As distinguished from the control logic 13 the drive circuit 14 may only be obtained in a limited number of forms of which two are shown on FIGS. 2 and 3.

The circuit of FIG. 2 comprises three branches connected in parallel between the two poles of the DC voltage source (not shown) which serves to provide energy to the control circuit assembly for the motor.

Each of the three branches is formed from two CMOS transistors connected in series, the drains of these transistors being coupled to one another and their respective sources connected to the poles of the voltage source. On the figure the P channel transistors bear references $T_1$, $T_3$, $T_5$ while the N channel transistors are designated by $T_2$, $T_4$ and $T_6$.

A first terminal A of winding $7_a$ (see also FIG. 1) is connected directly to the junction of the drains of transistors $T_1$ and $T_2$, while the other terminal B of the same winding is coupled to the junction of the drains of transistors $T_3$ and $T_4$ via a seventh transistor $T_7$ which may be of the P or N type. The terminals C and D of the winding $7_b$ are coupled respectively to the junction between transistors $T_3$ and $T_4$ and to the junction between the drains of transistors $T_5$ and $T_6$.

Finally, the energization circuit further comprises an eighth transistor $T_8$ of the type P or N the source drain path of which couples the terminal B of winding $7_a$ to the junction between transistors $T_5$ and $T_6$ and the gate of which is coupled as those of all the other transistors $T_1$ to $T_7$ to the control logic 13.

Table 1 herebelow summarizes the operation of the circuit.

In the table the first column indicates if the windings are connected in series or in parallel. In the second column, the sign "+" signifies that the coil is traversed by a positive current which for each winding corresponds to the sense indicated by an arrow on FIG. 2. The sign "−" indicates that the coil is traversed by a negative current and the abbreviations "cc" and "co" that the windings are respectively placed in short-circuit and in open-circuit. The other columns show for each situation the state of conductivity of the different transistors. By analogy with switches the term "closed" signifies that the transistor conducts and the word "open" that it is blocked.

It is to be noted that the arrows which indicate the positive sense of the current in the windings are opposed since these latter are as on FIG. 1 wound in opposed sense.

It should likewise be noted that there exist in fact several possibilities for short-circuiting and open-circuiting the windings although the table gives only one thereof.

TABLE I

|  |  | $T_1$ | $T_2$ | $T_3$ | $T_4$ | $T_5$ | $T_6$ | $T_7$ | $T_8$ |
|---|---|---|---|---|---|---|---|---|---|
| Series | + | open | closed | closed | open | open | open | open | closed |
|  | − | closed | open | open | closed | open | open |  |  |
|  | cc | closed | open | closed | open | open | open |  |  |
|  | co | open | open | open | open | open | open |  |  |
| Parallel | + | open | closed | closed | open | open | closed | closed | open |
|  | − | closed | open | open | closed | closed | open |  |  |
|  | cc | closed | open | closed | open | closed | open |  |  |
|  | co | open | open | open | open | open | open |  |  |

The other form of execution of the drive circuit as shown in FIG. 3 is more interesting than that which has just been described inasmuch as it permits the elimination of a transistor.

In this case the circuit comprises a classic bridge of 4 transistors connected between the positive and negative poles of the energy source, each branch of the bridge including a transistor of P type, respectively $T_1'$ and $T_5'$ and a transistor of N type, respectively $T_2'$ and $T_6'$.

In the diagonal of the bridge is found winding $7_a$ with its first terminal A connected to the junction of the drains of transistors $T_1'$ and $T_2'$, the winding $7_b$ with its first terminal C connected to the junction of transistors $T_5'$ and $T_6'$ and transistor $T_7'$ of P or N type the conduction path of which couples the second terminals B and D of the two windings. Also forming part of this diagonal is transistor $T_3'$ which permits the connection of terminal B of the winding $7_a$ to the junction between transistor $T_5'$ and $T_6'$ and another transistor $T_4'$ connecting the junction of transistors $T_1'$ and $T_2'$ and the second terminal, D, of the winding $7_b$. As in the case of transistor $T_7'$, transistors $T_3'$ and $T_4'$ may be of the P or N type.

The transistors $T_1'$, $T_2'$, $T_5'$, $T_6'$ have as function the application of motor drive pulses to the windings and the transistors $T_3'$, $T_4'$ and $T_7'$ that of connecting the two windings in series or in parallel.

With this arrangement the arrows indicating the positive sense of the currrent in the windings have the same orientation.

The operation of this circuit is given in Table II herebelow, which is completely analogous to Table I.

TABLE II

|  |  | $T_1'$ | $T_2'$ | $T_3'$ | $T_4'$ | $T_5'$ | $T_6'$ | $T_7'$ |
|---|---|---|---|---|---|---|---|---|
| Series | + | open | closed | open | open | closed | open | closed |
|  | − | closed | open |  |  | open | closed |  |
|  | cc | closed | open |  |  | closed | open |  |
|  | co | open | open |  |  | open | open |  |
| Parallel | + | open | closed | closed | closed | closed | open | open |
|  | − | closed | open |  |  | open | closed |  |
|  | cc | closed | open |  |  | closed | open |  |
|  | co | open | open |  |  | open | open |  |

By way of example, with a motor having mechanical and electrical characteristics as follows:
  Permeability of the circuit: $A = L/N^2 = 40$ nH
  Maximum value of the coupling coefficient: $\gamma_o = 0.25$ μNm/At
  Moment of inertia of the rotor: $J = 3.5 \cdot 10^{-12}$ kgm²
  Dry friction coupling: $C_s = 3.5 \cdot 10^{-8}$ Nm
  Viscous friction coefficient: $f = 10^{-10}$ Nm/rd/s
  Maximum value of the positioning couple: $T_2 = 0.35$ μNm
  Number of turns in each winding: $N = 13\,300$
  Resistance of each winding: $R = 3700\,\Omega$
and with a drive voltage of 1.55 V one obtains with the two windings connected in series and a duration of the motor drive pulse of 7.8 ms, a maximum useful couple of 0.22 μNm and an average current of about 105 μA. In this case the maximum frequency at which the motor may be controlled is the same as for a motor with a single coil, i.e. on the order of 50 or 60 Hz.

On the other hand, if both windings are connected in parallel, one will have for a pulse duration half as long a useful couple of 0.30 μNm and an average current of about 518 μA. The maximum frequency is then doubled.

As there is no reason to have a useful couple of higher value at high speed than at low speed, it is possible further to reduce the duration of the motor drive pulses until such couple has approximately the same value as for the connection of the windings in series which happens for pulses of about 3 ms. This leads to an additional increase of approximately 30% of the maximum frequency and brings its value to 130 or 150 Hz.

One may thus approach a theoretical synchronous frequency which is on the order of 200 Hz.

Moreover, it is still possible to improve the performances of the motor at high speed without diminishing its operation at low speed by providing windings of different resistance, e.g. R/2 and 3R/2 in order to obtain an equivalent resistance still lower.

The invention thus permits attaining the same result as the solution sought by U.S.A. patent application Ser. No. 530 116 whilst employing a simplified control circuit.

It is no disadvantage that the two methods are completely compatible and that in order to increase still further the maximum speed of operation of the motor one may very well call on the two at the same time.

Since the synchronous frequency is given by the formula:

$$f_s = \left| \frac{U_i}{2\pi \, N \, \gamma^0} \right|$$

where N generally designates the number of turns of the coil, $U_i$ is the voltage induced by the movement of the rotor and $\gamma^o$ the maximum value of the coupling coefficient, it is obvious that this frequency is doubled when the number of turns is halved. Now this is precisely what happens when in the case of the motor assembly of FIG. 1, one goes from the series connection to the parallel connection of the two windings $7_a$ and $7_b$.

The combination of the two solutions enables thus to attain a maximum frequency on the order of 400 Hz.

Unfortunately this is still insufficient for a watch with a seconds hand since a correction of six hours would take more than 50 seconds. In fact, in order to obtain acceptable correction times, it would be necessary to have a frequency five times greater.

Experience has shown that it would be possible to attain such a value in calling at the same time on the present invention together with the well-known servo technique. In the particular case of the motor assembly of FIG. 1, this means additionally including in the control circuit 2 a system for detecting permanently a parameter respresentative of the position of the rotor 9 when this latter rotates at high speed and to realize the control logic 13 in a manner such that a current is continuously applied to the windings $7_a$, $7_b$, the sense of this current being reversed twice per revolution when the rotor passes through predetermined opposite positions. These positions may be those of the rest positions but they are preferably situated in advance thereof. For instance, the reversal may take place shortly after the N-S axis of the rotor is in the principal direction of the magnetic field in the stator, i.e. the direction perpendicular to that which joins the necks $5_a$ and $5_b$. As to the parameter to be detected it may be the current in the windings, the voltage induced in the windings by the movement of the rotor, the variation of the flux in the stator, etc. . . . .

When this servo technique is employed for the motor the different parameters of which have the values indicated previously, one will note that the speed of the rotor is stabilized only at about 620 steps per second. By modifying these values it is possible to attain the 2000 Hz sought for.

It is easily seen that when the rotor is caused to turn at such speeds it is necessary to brake it to be able to stop it at the desired instant, above all if the number of steps which it effects at high speed must be completely determined which is the case for instance for a change in the time zone or when the hands are employed to indicate other matters than the time of day and then brought back to their original position.

An efficient solution for bringing about this braking consists of providing a resistance of sufficient value in the control circuit of the motor as well as means enabling the connection of this resistance in series with the two windings then connected in parallel, this during a certain time before stopping the transmission of motor drive pulses of high frequency to the motor.

Naturally the braking is that much greater as the value of the resistance is higher and such value must be chosen as a function of the parameters of the windings, the speed at which it is foreseen to have the rotor turn and the time during which the resistance is connected. It will in general be of the same order as that or those of the windings and very often one may choose a value essentially equal to the difference between the equivalent resistance of the windings when the latter are respectively connected in series and in parallel, which in the particular case of two identical windings of resistance R, corresponds to 3R/2.

Thus, in the numerical example which has been chosen, this value 3R/2 is approximately 5000Ω and enables reducing the speed of the motor from 620 to about 120 steps per second, this being completely suitable.

It is to be noted moreover that the additional resistance may well be used not only for slowing the motor at the end of a period of operation at high frequency, but likewise for regulating the speed of the motor during this entire period. In this case the motor control circuit must additionally include means for detecting the instantaneous speed of the rotor and means for connecting the resistance during a predetermined time when this speed goes over a certain threshold or better, for connecting the resistance when the speed becomes greater than a first value and disconnecting it from the moment that the speed falls below a second value less than the first. As should be well understood, this system of regulation must be rendered inoperative at the moment of the final braking.

Figure 4:
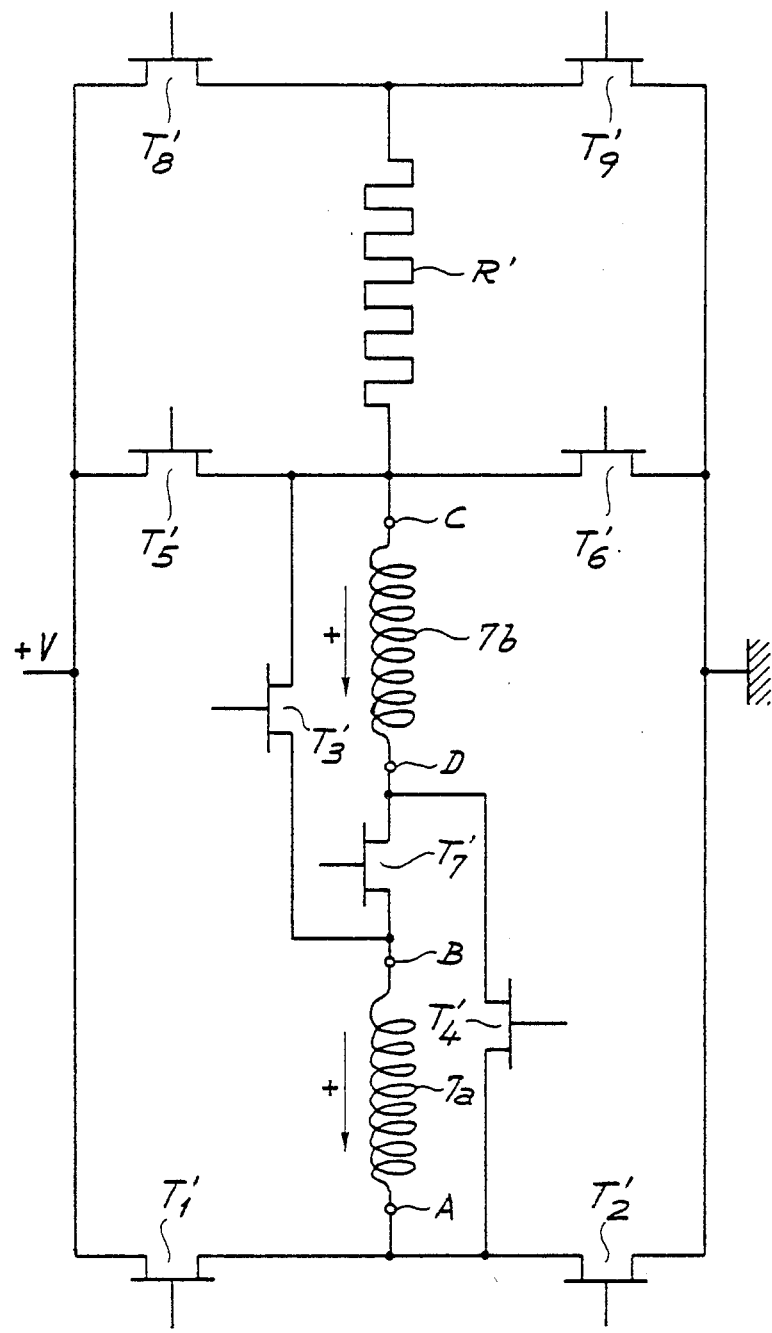
FIG. 4 is another detailed schematic of the drive circuit corresponding to the embodiment of FIG. 3 but for a variant of the motor assembly as shown on FIG. 1.

FIG. 4 shows by way of example how the energization circuit of FIG. 3 may be modified when for the motor assembly of FIG. 1 one provides a resistance for the slowing and eventually for speed control of the rotor.

It may be seen that in fact it concerns not really a modification, but merely the addition to the circuit of a third branch in parallel with the first two branches and likewise formed by a P type transistor, $T_8'$, and an N type transistor, $T_9'$, the resistance $R'$ for instance of a value essentially equal to 3R/2 being connected between the junction of the drains of transistors $T_8'$ and $T_9'$ and that of the drains of transistors $T_5'$ and $T_6'$.

When resistance $R'$ is to be connected in series with windings $7_a$ and $7_b$, transistors $T_5'$ and $T_6'$ both remain blocked and it is then transistors $T_8'$ and $T_9'$ which permit controlling the flow of current in one sense or in the other in both the resistance and the two windings then coupled in parallel.

The invention is certainly not limited to the particular method of realization thereof and to the version which has just been described.

In particular, independently from the control logic which has not been described in detail, the drive circuit may take on forms other than those which have been disclosed.

One can thus foresee using several additional resistances for the braking and the speed regulation of the rotor as well as means for selecting one or the other of such resistances, i.e. should there be a question of having the motor function not only at low speed and at high speed, but also at one or several intermediate speeds.

Moreover, as has already been said, the invention may be extended to numerous types of stepping motors.

In addition to different motors of the Lavet type, one may cite as possible examples of application motors normally having a single winding, but truly bidirectional which are derived from the type mentioned and which are the object of Swiss Pat. No. 616 302 and of the published European patent application 0085 648 or the two-phase motor of which several forms are described in Swiss Pat. Nos. 625 646 and 634 696.

What we claim is:

1. A motor assembly comprising a stepping motor having a rotor, a stator, coil means born by the stator and a control circuit for applying motor drive pulses of low frequency to the coil means to operate the motor at low speed and of high frequency to operate the motor at high speed wherein said coil means comprises n (n≧2) windings and said control circuit is arranged and adapted to connect the n windings in series when low frequency drive pulses are applied thereto and in parallel when high frequency pulses are applied thereto.

2. A motor assembly as set forth in claim 1 wherein the number of windings is two.

3. A motor assembly as set forth in claim 1 wherein the n windings each have basically the same number of turns N and basically the same electrical resistance R.

4. A motor assembly as set forth in claim 1 wherein said control circuit is arranged and adapted to connect a resistance in series with the windings when said windings are connected in parallel, said resistance being connected during a braking period of the rotor which precedes the end of application of high frequency motor drive pulses to the windings.

5. A motor assembly as set forth in claim 4 wherein said resistance is of a value essentially equal to the difference between the equivalent resistances of the windings when said windings are connected respectively in series and in parallel.

6. A motor assembly as set forth in claim 1 wherein the control circuit is arranged and adapted to short-circuit said windings during the time interval separating the end of a high frequency motor drive pulse from the beginning of the next one.

7. A motor assembly as set forth in claim 1 wherein the control circuit is arranged and adapted to open circuit said windings during the time interval separating the end of a high frequency motor drive pulse from the beginning of the next one.

8. A motor assembly as set forth in claim 1 wherein the control circuit is arranged and adapted so that when high frequency motor drive pulses are applied to the motor coil means the windings are open circuited during a first period over the time interval separating two successive motor drive pulses and short circuited during a second period.

9. A motor assembly as set forth in claim 1 wherein the high frequency motor drive pulses are of shorter duration than those of low frequency.

10. A motor assembly as set forth in claim 9 wherein the duration of the high frequency motor drive pulses is basically equal to half that of the low frequency motor drive pulses.

* * * * *